United States Patent [19]
Lund

[11] 3,777,456
[45] Dec. 11, 1973

[54] EXTRACTING WATER FROM THE ATMOSPHERE

[76] Inventor: Basil Gilbert Alfred Lund, 6th Floor, Lestar House, 56 Marshall St., Johannesburg, South Africa

[22] Filed: Oct. 1, 1971

[21] Appl. No.: 185,780

Related U.S. Application Data

[63] Continuation-in-part of Ser. No. 805,047, March 6, 1969, abandoned, which is a continuation of Ser. No. 653,858, July 17, 1967, abandoned.

[30] Foreign Application Priority Data
July 22, 1966 South Africa.............................. 4,346

[52] U.S. Cl. ................................................. 55/32
[51] Int. Cl. ........................................... B01d 53/14
[58] Field of Search ..................................................
55/29–32, 35, 90, 83–85, 233, 240, 241; 203/11, 88; 261/DIG. 11

[56] References Cited
UNITED STATES PATENTS
3,385,575   5/1968   Hall ........................................ 55/32
3,105,748   10/1963  Stahl ....................................... 55/32

OTHER PUBLICATIONS

Combustion, "Design and Selection of Hyperbolic Cooling Towers," 1-1960, pp. 42-54.

Ledoux, "Vapor Adsorption," 1945, Chemical Publishing Co., Inc., pp. 242-247.

*Primary Examiner*—Charles N. Hart
*Attorney*—Irvin S. Thompson et al.

[57] ABSTRACT

Water is extracted from the atmosphere by circulating a large volume of a solution of lithium chloride in water continuously over a Munters packing in a tower of conventional cooling tower design. Excess solution formed as a result of the absorbtion of water is bled off and passed through a desalination plant where product water is produced. Concentrated brine is returned to the circulating volume.

2 Claims, 3 Drawing Figures

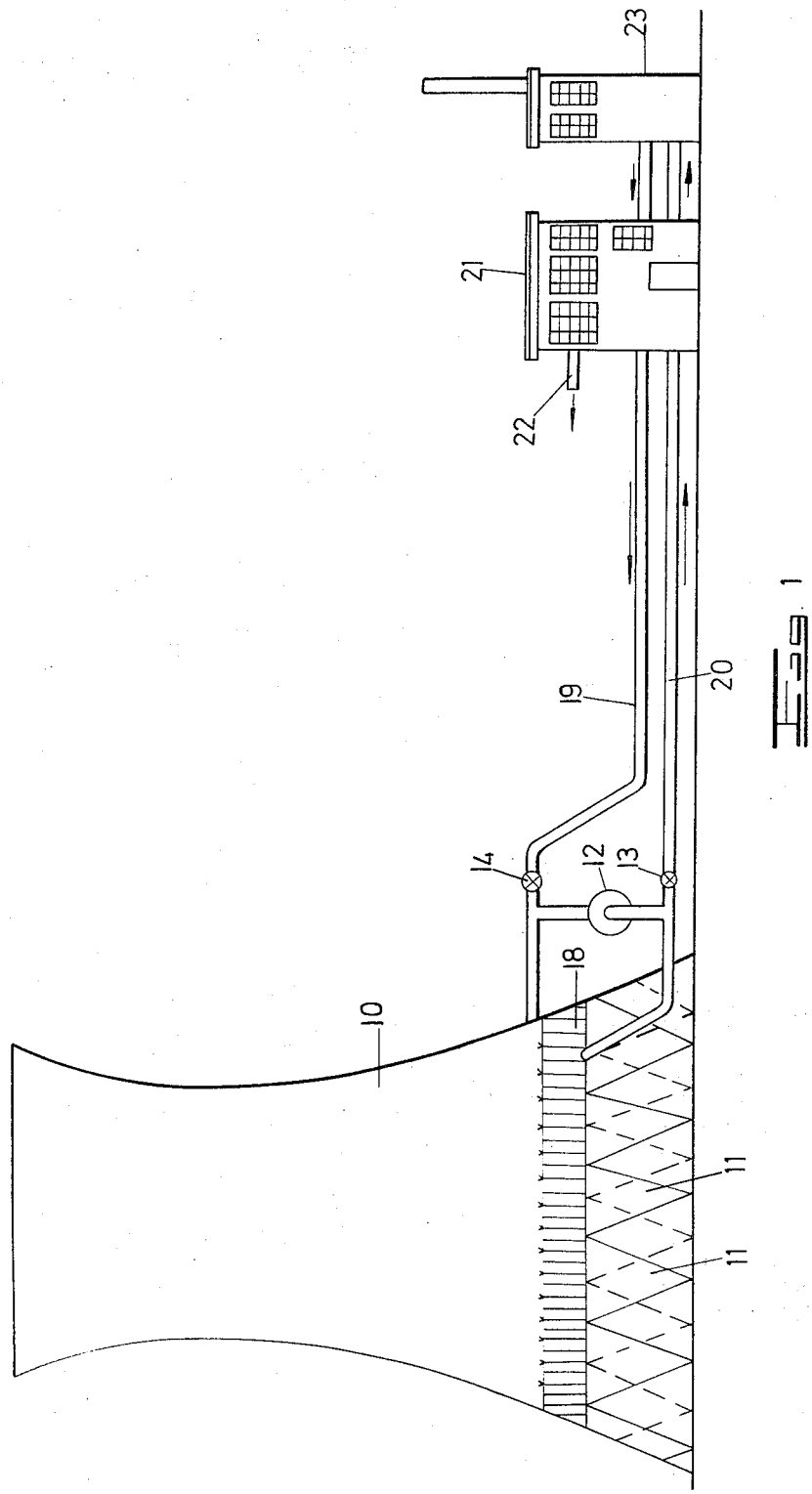

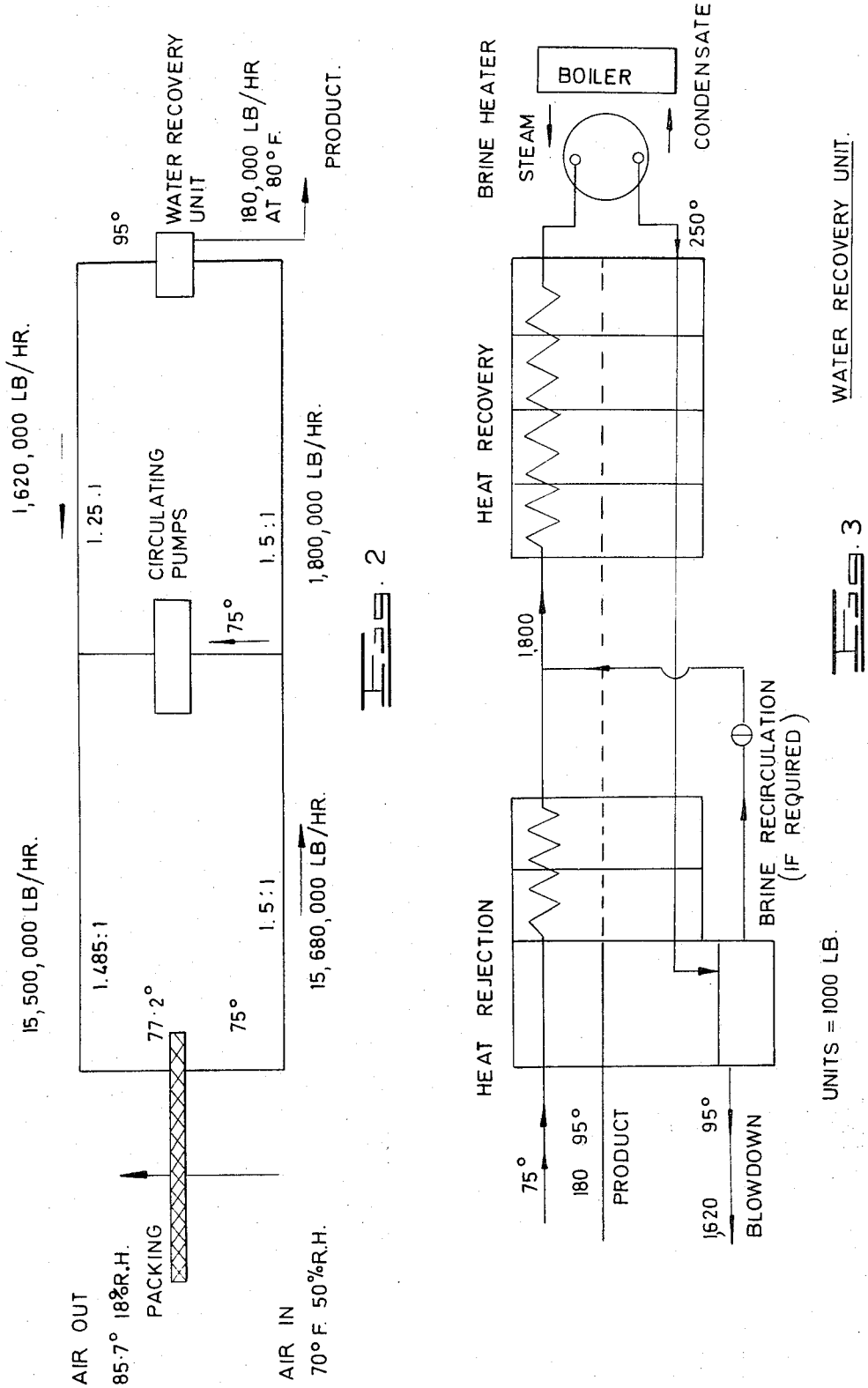

EXTRACTING WATER FROM THE ATMOSPHERE

This invention relates to the extraction of water from the atmosphere and is a continuation-in-part of my application Ser. No. 805,047 filed Mar. 6, 1969, which in turn is a continuation of application Ser. No. 653,858, filed July 17, 1967. Both applications are now abandoned.

It has already variously been realised that the atmosphere, even in relatively arid localities, contains very large amounts of water vapour. It is therefore not surprising that a number of inventors have proposed systems for extracting that water vapour in the form of usable water.

One prior proposal which is of interest is that contained in U.S. Pat. No. 3,385,575. A hygroscopic solution is circulated from a feed tank to a tower where contact with the air takes place. The collected solution which has taken up moisture from the air is pumped to a distillation plant from which water is recovered and hygroscopic solution is returned to the feed tank. This U.S. specification is primarily concerned with ensuring efficient contact between the hygroscopic solution and air on contacting elements in the tower. Very little is said about how the air is brought into contact with the elements in the tower which is said to be an open tower.

As a hygroscopic substance a lithium chloride solution appears to be the first choice and it has in fact been used for removing moisture from air in air conditioning systems.

In air conditioning systems and in the system of the prior U.S. patent discussed above, the amounts of water recovered are relatively small. In fact suppliers of lithium chloride usually quote for small masses only. This shows that nowhere in the world a large scale system for extracting moisture from air in any way has come into use. This is easy to understand if one bears in mind that on psychometric charts the maximum weight of water per pound of ambient air is given as less than 100 grains per pound and that 1 pound of air could occupy as much as 13.5 cubic feet. See for example "Air Conditioning and Elements of Refrigeration" by Samuel P. Brown (McGraw-Hill), First Edition, 1947, at page 134.

Any commercial scale system for extracting water from the atmosphere has to provide water on a scale needed for a small town or city. If one thinks of hundreds of thousands of gallons of water, it in effect means that one is thinking of millions of pounds of air multiplied by a factor of the order of 13.5 to arrive at the volume in cubic feet of air.

In order to arrive at a practical solution to the main problem there are several interrelated subsidiary problems.

An object of the invention is to provide solutions to each of the subsidiary problems so that the main problem can be solved in what is believed to be a relatively economical manner.

The invention is further discussed below with reference to the accompanying drawings, in which FIG. 1 is a diagrammatic layout of a typical system of the invention, FIG. 2 is a block diagram of the system with numerical values for a particular case, and FIG. 3 is a block diagram of a water recovery unit also with numerical values.

As illustrated in the FIG. 1 an installation has a tower 10. This tower 10 is of a design that has become conventional for cooling tower design in thermal power stations and converges from the base to a waist and diverges to its top. The tower 10 is provided in a known way with a film packing 18. Note that as shown the film packing is above the base and across the tower. It is also possible to have the film packing in across the openings 11 at the base of the tower.

The nature of the packing is important. It should be such that the minimum amount of liquid is required for wetting it. The art of packings has developed to a considerable extent of late. In South Africa normal loadings in cooling towers are as high as 2,000 lb./square foot/per hour. A packing made of plastics and known as the Munters packing works at loadings of 250 lb./sq. ft./hour. For present purposes the Munters packing is preferred.

The lower the loading on the packing the less the amount of liquid that is required to be in circulation.

Liquid coming from the packing 18 is circulated back to the packing 18 by means of a pump 12. Circulation is in the direction of the arrows in FIG. 1.

There is also a bleed-off of liquid to a desalination plant 21 along the pipe 20 controlled by a valve 13. Brine from the plant 21 is recycled along the pipe 19 through a oneway valve 14. A boiler plant 23 suplies steam for the plant 21.

The circulating liquid is a solution of lithium chloride in water, say, an 80 percent solution, when it reaches the top of the packing 18.

Thus a volume of solution circulates between the packing 18 and the pump 12. Another volume of solution circulates between the packing 18 and the plant 21.

An important feature of the invention relates to what takes place inside the tower 10. Air at ambient temperature enters the tower at the base, contacts the liquid that wets the packing 18. If the vapour pressure of the solution of lithium chloride is low enough, water will leave the air and enter the solution. This has two effects: (a) the air is dried and becomes less dense and therefore rises in the tower 10 and (b) the heat of condensation and heat of solution add thermal energy to the air which is thereby heated up and thus the tendency to rise is increased. The net result is that water is removed from the air and that the air is caused to rise in the tower 10.

The next important feature is the regulation of the bleed-off through the valve 13 and the recirculation through the pump 12. Enough solution must circulate over the packing 18 to keep it wetted and to cause the air to rise up the tower. At the same time sufficient water must be bled-off along the pipe 20 to ensure that brine arriving along the pipe 19 keeps the concentration of lithium chloride in the solution at a level where water is taken from the air and the air is caused to rise as a result of this water-exchange. Residual heat in the brine solution also assists in imparting thermal energy to the rising air.

The plant 21 as illustrated is one in which water is recovered from the solution by flash distillation. Other methods of removing water from the solution may be used if they are practicable and economic.

FIG. 2 illustrates quantitatively a plant which has been designed to produce 180,000 lb. of water per hour or 450,000 gallons a day at sea level where the ambient relative humidity is 50 percent. The solution used is lithium chloride salt in water.

A reduction in the relative humidity of the air from 50 to 18 percent means that the water content is reduced from 55 grains per pound to 32 grains per pound, i.e., a water-exchange of 23 grains. To yield the required number of gallons of water $775 \times 10^6$ cubic feet of air per hour has to flow through the tower 10.

To achieve this air flow a Munters packing of 7 million square feet is required. If the packing is 15 inches deep the packing occupies effectively 62,000 square feet leading to a tower diameter at the packing level of 305 feet. The air velocity through the packing is 208 feet per minute and the water gauge required to achieve this is 0.0027 inches. At the same time the head loss through the packing is 0.0435.

The density of air outside the tower is 13.52 cubic ft./lb. and above the packing 13.80 cubic ft./lb. or 0.0740 and 0.0722 lb./cubic ft. respectively, i.e., a difference of 0.0018 lb./cubic ft. With a tower that is 350 ft. high this gives a water gauge of 0.12 inches, which is quite adequate for the purposes in hand.

In other words the tower 10 is 305 feet in diameter at the packing level and 350 feet high.

The minimum flow rate on a Munters packing to achieve complete wetting is 25 gal./sq. ft./hour. Thus the solution flow in the tower must be 15,500,000 lb. of solution per hour if the concentration is 1.5 lb. of water per lb. of salt. In flowing through the packing it picks up 180,000 lbs. of water per hour. The temperature of the incoming solution is 77.2°F and of the outgoing solution 75°F. The incoming air is at a temperature of 70°F and the air emerging from the tower is at 85.7°F.

The total volume in circulation is so arranged that a bleed-off of 1,800,000 lbs./hr. is taken to the plant 21. From that plant 1,620,000 lbs./hr. is returned to the packing.

The events inside a typical water recovery unit are illustrated in FIG. 3. This is standard and needs no further elucidation.

I claim:

1. A method of producing water from the atmosphere consisting in continuously circulating a volume of a hygroscopic liquid in a circulating path through a first stage in which the liquid is pumped, a second stage in which the liquid is caused to flow in film form in contact with air in a chimney which is open top and bottom to the atmosphere but closed on the other sides, thereby to cause water from the air to pass into the circulating liquid and to decrease the density of the air which rises in a chimney as a result of the decrease in density and a third stage in which the thus contacted liquid is collected before passing to the first stage, bleeding off a minor proportion of the circulating hygroscopic liquid after it has left the second stage while recirculating the remaining major proportion of the circulating hygroscopic liquid to the second stage, separating water from the thus bled off minor proportion of liquid to produce product water and a concentrated hygroscopic liquid, and returning the concentrated hygroscopic liquid to the recirculating major proportion of hygroscopic liquid before it passes to the second stage.

2. A method as claimed in claim 1 in which the volume that is bled off is so chosen that the area of liquid film in contact with the air remains substantially constant.

* * * * *